[54] RUTILE MIXED PHASE PIGMENTS WITH IMPROVED COLORISTIC PROPERTIES

[75] Inventors: Volker Wilhelm, Bergisch-Gladbach; Manfred Mansmann, Leverkusen, both of Fed. Rep. of Germany

[73] Assignee: Bayer Aktiengesellschaft, Leverkusen, Fed. Rep. of Germany

[21] Appl. No.: 273,838

[22] Filed: Nov. 21, 1988

[30] Foreign Application Priority Data

Dec. 1, 1987 [DE] Fed. Rep. of Germany ....... 3740635

[51] Int. Cl.$^5$ .............................................. C04B 31/02
[52] U.S. Cl. ...................................... 106/441; 106/444
[58] Field of Search ................. 106/441, 444, 453, 455

[56] References Cited

U.S. PATENT DOCUMENTS

| | | | |
|---|---|---|---|
| 4,222,789 | 9/1980 | Jacobson | 106/441 |
| 4,433,594 | 3/1969 | Wilson | 106/444 |
| 4,624,710 | 11/1986 | Modly | 106/441 |

*Primary Examiner*—Peter D. Rosenberg
*Attorney, Agent, or Firm*—Connolly and Hutz

[57] ABSTRACT

Chromium-antimony-rutile mixed phase pigments containing from 0.01 to 0.25% by weight of lithium are surprisingly insensitive to rapid cooling and chilling and are used for coloring plastic compositions such as polyamide or ABS plastics.

9 Claims, No Drawings

RUTILE MIXED PHASE PIGMENTS WITH IMPROVED COLORISTIC PROPERTIES

This invention relates to chromium-antimony-rutile mixed phase pitments with improved coloristic properties, to a process for their preparation and to their use.

BACKGROUND OF THE INVENTION

Mixed phase pigments with a rutile structure have long been known. Mixed oxides with a rutile structure can be produced in color shades extending over wide ranges of the visible spectrum by incorporating metal oxides such as NiO, $Cr_2O_3$, CuO and MnO with $Sb_2O_5$, $Nb_2O_5$ and $WO_3$ in the crystal lattice of the titanium dioxide.

If the color producing metal ion which has been incorporated has a valency other than 4 then another metal oxide of a different valency is also incorporated in the rutile lattice to equalize the valency so that the incorporated metal oxides in the lattice satisfy the following condition:

$$aA^{n+}O_{\frac{n}{2}} + bB^{m+}O_{\frac{m}{2}} = (a+b)\left(A\frac{a}{a+b}B\frac{b}{a+b}\right)O_2$$

It follows from this that for a and b:

$$a.n + b.m = 4(a+b)$$

In the above equations:
- A: denotes an incorporable metal such as $Cr^{3+}$, $Ni^{2+}$, $Cu^{2+}$ or $Mn^{3+}$,
- B: denotes an incorporable metal such as $Sb^{5+}$, $Nb^{5+}$ or $W^{6+}$,
- O: stands for an oxygen atom,
- n: denotes the valency of the incorporated metal A, where n=2 or 3,
- m: denotes the valency of the incorporated metal B, where m=5 or 6 and
- a and b stand for small whole numbers.

These ratios are generally for the most part observed but rutile mixed phase pigments which deviate considerably from this idealized composition are also known.

Nickel- and chromium-rutile mixed phase pigments have achieved considerable technical importance. When nickel oxide and chromium oxide are incorporated in $TiO_2$ as color producing oxides, metal oxides of a higher valency are also incorporated for valency equalization, especially oxides of antimony but also oxides of niobium and/or tungsten (Nos. US-A-1 945 809, US-A-2 251 829, US-A-2 257 278, US-A-3 832 205).

Pigments of this type are produced from anatase and/or hydrates of titanium dioxide with incorporable metal oxides or compounds giving rise to these metal oxides by annealing them at temperatures of about 900° to about 1200° C. and then grinding the annealed products (US-A-3 022 186, Ullmanns Encyklopadie der technischen Chemie, 4th Edition, Volume 18 (1979), pages 608 to 609).

The rutile mixed phase pigments have a high resistance to light, weathering, acids and alkalis as well as being resistant to other chemicals and they are also stable at temperatures of up to about 1000° C. Further details may be found in "Lehrbuch der Lacke and Beschichtungen, Volume II, Pigmente, Fullstoffe, Farbstoffe", by Dr. Hans Kittel, published by W. A. Colomb in the publishing company W. Heinemann GmbH in 1974, Berlin Oberschwandorf, pages 92 to 95.

The excellent stability of the color tone on exposure to light and weathering even in very light shades, for example when lacquers based on alkyl-melamine resins or silicone polyesters are exposed to weathering, predestine these pigments for the pigmentation of stoving lacquers or coil coat lacquers.

The pigmentation of plastics with rutile mixed phase pigments is also gaining increasingly in importance.

The rutile mixed phase pigments which have hitherto been of the greatest economical importance are those which contain chromium (III) oxide and in which antimony oxide in particular but also nioium and/or tungsten oxide are incorporated as metal oxides of a higher valency.

The object of various patent applications for such rutile mixed phase pigments containing chromium (III) oxide is a process of preparation providing pigments with improved coloristic properties such as color purity, saturation, intensity and covering power. Thus rutile nuclei which have been prepared separately before calcining of the mixture of raw materials are capable of increasing the purity of the color (DE-A-2 605 651). In USSR Patent Application SU-A 1 198 085, rutile mixed phase pigments containing chromium and antimony are improved in their covering power and color intensity by adding 2 to 10% of non-coloring chlorides of the first and second group of the periodic system before the mixture of raw materials is calcined.

The known mineralizers for rutile mixed phase pigments, such as lithium fluoride or sodium fluoride, for example, which are mentioned as of equal value in US-A-3 022 186, are known to be used for facilitating the reactions of the solid substances by the presence of a fluid phase. Thus the presence of a mineralizer may reduce the time required for a solid body reaction and lower the temperature required or enable a more complete reaction to take place. The addition of alkali metal and alkaline earth metal chlorides according to SU-A 1 198 085 must be taken to serve the same purpose.

Chromium-antimony-rutile mixed phase pigments have the undesirable characteristic of being sensitive to chilling, i.e. to rapid cooling, which may result in a loss of color purity. This sensitivity to chilling is particularly pronounced in the darker, fuller types of pigments for which a larger quantity of color producing chromium oxide is added and/or higher calcining temperatures are employed. Lighter color pigments, which are generally prepared at somewhat lower temperatures, are less sensitive to chilling but still sensitive to such an extent that a difference in quality is noted compared with products which have been cooled more slowly.

Investigation of other rutile mixed phase pigments has surprisingly shown that these other pigments, e.g. nickel-antimony-rutile or chromium-tungsten-rutile mixed phase pigments were insensitive to rapid cooling.

The sensitivity to chilling described above is also found to occur when chromium-antimony-rutile mixed phase pigments are used for coloring plastics, especially those which require relatively high processing temperatures, such as polyamides or ABS plastics. When such pigments are heated to temperatures higher than about 260° C. in the course of processing, they undergo undesirable color changes.

It is an object of the present invention to provide chromium-antimony-rutile mixed phase pigments whose colouristic properties are not impaired by rapid cooling, i.e. are not sensitive to chilling.

BRIEF DESCRIPTION OF THE INVENTION

It has now been found that this requirement is fulfilled by chromium-antimony-rutile mixed phase pigments containing from 0.01 to 0.25% by weight, preferably from 0.04 to 0.1% by weight of lithium. These chromium-antimony-rutile mixed phase pigments are the subject of the present invention.

DETAILED DESCRIPTION

It must be regarded as surprising that the desired properties are found precisely in these chromium-antimony-rutile mixed phase pigments which are only so slightly doped since the quantity of lithium contained in these pigments must be regarded as critical. Whereas mineralizers such as lithium fluoride or sodium fluoride, etc. are generaly added in quantities of several percentages or even many percentages by weight, the addition of lithium suitable for producing the required effect is limited to very small quantities. The most suitable lithium contents have been found to lie in the range of from 0.01 to 0.25%, based on the sum of the oxides, $TiO_2$, $Cr_2O_3$ and $Sb_2O_5$. Additions of lithium above this range do not provide the desired insensitivity to chilling but instead lead to badly sintered, dark and coloristically unsightly products.

If other compounds described as mineralizers are added, e.g. sodium fluoride, sodium chloride, potassium chloride, calcium fluoride or calcium chloride, then the sensitivity of the pigments to chilling remains.

The present invention also relates to a process for the preparation of the chromium-antimony-rutile mixed phase pigments according to the invention.

This process is characterised in that before calcining is carried out, one or more lithium compounds are added in such quantities to the mixture of raw materials corresponding to the composition of the chromium-antimony-rutile mixed phase pigments that the chromium-antimony-rutile mixed phase pigment obtained after calcining contains from 0.01 to 0.25% by weight, preferably 0.04 to 0.1% by weight of lithium.

After calcining, the chromium-antimony-rutile pigment contains lithium ions incorporated as an integral consituent of the crystal lattice.

The following substances, for example, may be used as lithium compounds for the preparation of chromium-antimony-rutile mixed phase pigments which are resistant to chilling: lithium carbonate, lithium fluoride, lithium chloride, lithium oxide, lithium hydroxide, lithium sulphate, lithium nitrate, lithium phosphate, lithium antimonate and lithium titanate. For practical reasons, it is preferred to use lithium carbonate in dry mixtures of raw materials and lithium titanate for wet mixtures of raw materials owing to its insolubility in the liquid phase even when the reaction is acid.

The doping with lithium according to the invention gives rise to pigments which are insensitive to chilling and which are particularly suitable for use in plastics. This invention therefore relates to the use of the chromium-antimony-rutile mixed phase pigments according to the invention for coloring plastics. The insensitivity of the pigments to chilling is, of course, also an advantage in the process of preparation, as when the calcined hot pigment is being discharged from the calcining furnace.

The invention is described below with the aid of examples which are not to be regarded as limiting.

EXAMPLE 1

40 kg of $Cr_2O_3$ and 100 kg of $Sb_2O_3$ are added to 800 kg of $TiO_2$ which is in the form of an aqueous, sulphuric acid suspension of hydrate including rutile nuclei and the components are vigorously mixed. To this mixture are added 10 kg of $Li_2TiO_3 = 0.1\%$ Li, based on the oxide content of the raw mixture, and the mixture is again homogenized. The suspension is thickened to about 50% and calcined at about 1000° C. in a directly heated rotary furnace. After annealing, the hot clinker from the furnace is dropped into a stirrer vessel filled with water, from which the suspension is delivered to the production line for working up the wet product. The pigment obtained after working up has a luminous orange/ochre color.

EXAMPLE 2

The procedure is the same as in Example 1 except that the quantity of $Li_2TiO_3$ is reduced to 4 kg = 0.05% Li. The pigment obtained from working up the product again has a luminous orange/ochre color.

EXAMPLE 3 (Comparison)

The procedure is the same as in Examples 1 and 2, except that the quantity of $Li_2TiO_3$ increased to 40 kg = 0.5% Li. Badly sintered, unsightly products are obtained which are almost impossible to work up into pigments.

EXAMPLE 4 (Comparison)

When the procedure described in Example 1 is repeated but without the addition of Li compounds, the products obtained after working up have a dirty greenish grey appearance.

EXAMPLE 5 (Comparison)

When the procedure described in Example 1 is repeated without the addition of Li compounds but the products are slowly cooled in a cooling zone instead of being chilled in water, luminous orange/ochre colored pigments are again obtained after working up.

EXAMPLE 6

The same as Example 1 except that anatase is used instead of $TiO_2$ hydrolysate, the $Li_2TiO_3$ is replaced by the corresponding quantity of $Li_2CO_3$ and the mixture is prepared dry.

EXAMPLE 7

When Li-doped chromium-antimony-rutile pigments according to Examples 1, 2 and 6 are incorporated in polyamides or ABS plastics and the processing temperatures are changed from 230° C. to 300° C. at intervals, colorimetric determinations show color differences between the zero sample (230° C.) and the final sample (300° C.) of about 1 $\Delta E$ unit (determined according to the CIELAB System).

EXAMPLE 8 (Comparison)

When the procedure described in Example 7 is carried out on pigments which have not been doped with Li and have been cooled slowly (Example 5), colorimetric determinations in ABS and polyamide systems show color differences between the zero sample (230° C.) and the final sample (300° C.) amounting to 10 $\Delta E$ units.

What is claimed is:

1. Mixed phase colored pigment which is a combined lithium-containing chromium oxide-antimonyoxide-rutile mixed phase pigment containing from 0.01 to 0.25% by weight of combined lithium.

2. Pigments according to claim 1 containing 0.04 to 0.1% by weight lithium.

3. Pigments according to claim 1 wherein the lithium is incorporated as an integral constituent of the pigment crystal lattice.

4. Process for the preparation of chromium-antimony-rutile mixed phase pigments according to claim 1 which comprises mixing chromium, antimony and titanium compounds in quantities corresponding to the composition of the chromium-antimony-rutile mixed phase pigments with at least one lithium compound and then calcining the mixture, wherein the amount of lithium compound is such that the chromium-antimony-rutile mixed phase pigment obtained after calcining contains from 0.01 to 0.25% by weight of lithium.

5. Process according to claim 4 wherein the amount of lithium compound mixed is such that after calcining the pigment contains 0.04 to 0.1% by weight lithium.

6. Process according to claim 4 wherein the chromium, antimony and titanium compounds are oxides and the lithium compound is lithium carbonate, lithium fluoride, lithium sulphate, lithium nitrate, lithium phosphate, lithium chloride, lithium oxide, lithium hydroxide, lithium antimonate or lithium titanate.

7. Process according to claim 4 wherein the lithium compound is lithium carbonate or lithium titanate.

8. Colored plastics which contain a color-imparting amount of pigments according to claim 1.

9. Colored plastics which contain polyamide or ABS plastics mixed with a color-imparting amount of pigments according to claim 1.

* * * * *